United States Patent
Michel et al.

(10) Patent No.: US 6,658,607 B1
(45) Date of Patent: Dec. 2, 2003

(54) METHOD FOR DETECTING TROUBLES OF TRANSMISSION IN SDH AND SONET

(75) Inventors: David Michel, Kfar Saba (IL); Amir Dabby, Holon (IL)

(73) Assignee: ECI Telecom Ltd., Petach-Tikva (IL)

( * ) Notice: Subject to any disclaimer, the term of this patent is extended or adjusted under 35 U.S.C. 154(b) by 0 days.

(21) Appl. No.: 09/576,905

(22) Filed: May 23, 2000

(30) Foreign Application Priority Data

Jul. 6, 1999 (IL) .................................................. 130323

(51) Int. Cl.[7] ................................................ G01R 31/28
(52) U.S. Cl. .................................... 714/712; 714/715
(58) Field of Search ............................... 370/253, 395, 370/219, 466, 217, 228; 714/712, 715; 455/426

(56) References Cited

U.S. PATENT DOCUMENTS

| | | | | | |
|---|---|---|---|---|---|
| 5,396,539 A | * | 3/1995 | Slekys et al. | ............... | 455/426 |
| 5,450,394 A | * | 9/1995 | Gruber et al. | ............... | 370/253 |
| 5,574,717 A | | 11/1996 | Tomizawa et al. | | |
| 5,657,320 A | * | 8/1997 | Russ et al. | ................... | 370/217 |
| 5,889,778 A | * | 3/1999 | Huscroft et al. | ............ | 370/395 |
| 5,896,391 A | | 4/1999 | Solheim et al. | | |
| 6,188,667 B1 | * | 2/2001 | Roberts et al. | ............. | 370/219 |
| 6,246,668 B1 | * | 6/2001 | Kusyk | ........................ | 370/228 |
| 6,426,958 B1 | * | 7/2002 | Crossett, III et al. | ....... | 370/466 |

* cited by examiner

*Primary Examiner*—David Ton
(74) *Attorney, Agent, or Firm*—Browdy and Neimark, P.L.L.C.

(57) ABSTRACT

A method for detecting troubles in transmission over a layer of connection in an SDH/SONET telecommunication network, the method comprising a step of obtaining periodically transmitted strings having a standard length (16 or 64 bytes), wherein each of the strings is formed using an overhead byte defined in the layer for the purpose; the method also comprises a step of checking the strings by applying to them a BIP16 procedure.

20 Claims, 1 Drawing Sheet

METHOD FOR DETECTING TROUBLES OF TRANSMISSION IN SDH AND SONET

FIELD OF THE INVENTION

Figure 1:
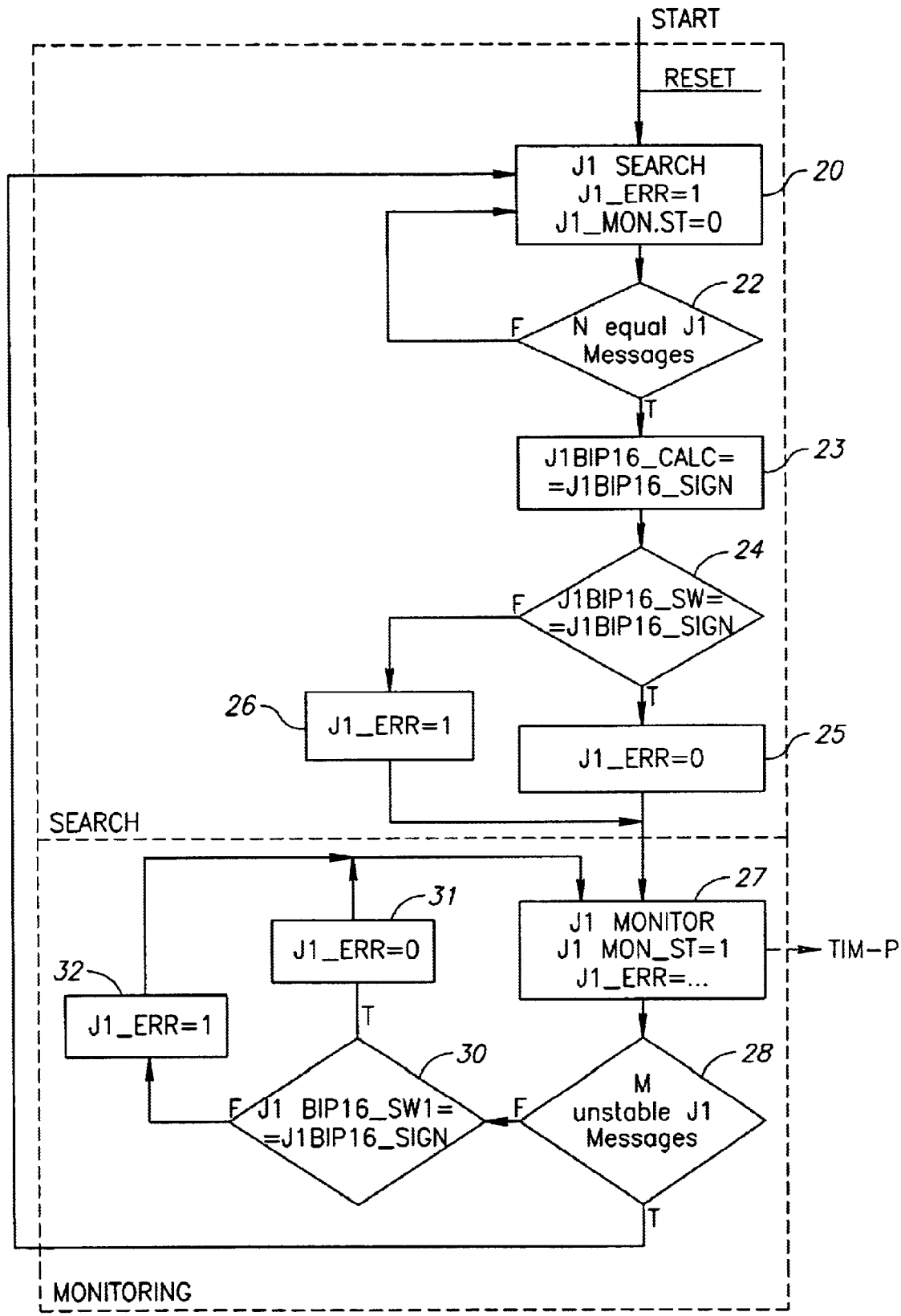

The present invention relates to a method of detecting troubles or non stable transmission in transport telecommunication networks based on either SDH or SONET standards, and in particular to a method of determining a trace indication mismatch in a path.

BACKGROUND OF THE INVENTION

Synchronous Optical NETwork (SONET) and Synchronous Digital Hierarchy (SDH) describe two families of closely related and compatible standards that govern interface parameters; rates, formats and multiplexing methods; operations, administration, maintenance and provisioning for high-speed signal transmission. SONET is primarily a set of North American standards with a fundamental transport rate beginning at approximately 52 Mb/s (i.e., 51.84 Mb/s), while SDH, principally used in Europe and Asia, defines a basic rate near 155 Mb/s (to be precise, 51.84×3=155.52 Mb/s). From a transmission perspective, together they provide an international basis for supporting both existing and new services in the developed and developing countries.

For transmitting data, SDH and SONET use frame formats transmitted every 125 μs (8000 frames/sec). Because of compatibility between SDH and SONET, their basic frames are similarly structured, but differ in dimension which fact reflects the basic transmission rates of 155.52 and 51.84 Mb/s, respectively. To be more specific, a basic frame format of SDH is 9 rows of 270 bytes, or 2430 bits/frame, corresponding to an aggregate frame rate of 155.52 Mb/s. For SDH systems, the mentioned basic frame transmitted at the rate 155.52 Mb/s forms the fundamental building block called Synchronous Transport Module Level-1 (STM-1). For SONET systems, the basic frame has dimensions of 9 rows by 90 byte columns and, being transmitted at the rate 51.84 Mb/s, forms the appropriate fundamental building block called Synchronous Transport Signal Level-1 (STS-1).

Lower rate payloads (data portions transmitted at rates smaller than the basic ones) are mapped into the fundamental building blocks, while higher rate signals are generated by synchronously multiplexing N fundamental building blocks to form STM-N signals (in SDH) or STS-N signals (in SONET).

Each basic frame in SONET or SDH comprises an information portion called Information Payload and a service portion called Overhead (OH), the latter being subdivided into a number of areas of overhead bytes (for example, Path Overhead—POH, Transport Overhead—TOH) predestined for various service and control functions. One of such areas is a column of Path Overhead (POH) usually residing within the Information Payload area. POH supports performance monitoring, status feedback, signal labeling, user channel and a tracing function in a path. This overhead is added and dismantled at or near the service origination/termination points defining the path, and is not processed at intermediary nodes. The SDH multiplexing structure, defined in ITU-T Recommendation G.707(03/96), comprises so-called virtual containers serving to combine lower rate payloads by mapping into these containers and adding POH. The combined payloads fitted with POH are further aligned and multiplexed in order to form an STM-N signal.

According to ITU-T Recommendation G.707(03/96), the POH of virtual containers consists of a plurality of bytes, most of which are used for end-to-end communication.

When an error is detected at a path terminating equipment (PTE), an Alarm Indication Signal (AIS) is to be transmitted to the downstream network elements, and a signal of Remote Defect Indication (RDI)—towards the upstream network elements. The AIS is stated to be in the form of all "1"-s sent in the payload associated with this path, and the RDI is a code sent in the path status byte G1 assigned in the POH for this purpose.

One of the important bytes of the POH is a Path Trace byte called J1. This byte is used to transmit repetitively a Path Access Point Identifier so that a path receiving terminal can verify its continued connection to the intended transmitter. In transport networks operating according to SONET, J1 is used to send a repetitive signal to form a 64 byte string (trace), while in networks utilizing SDH the repetitive signal produced by J1 byte is preferably in a format of 16 byte string (trace). However, in the SDH standard there is an option of a 64 byte free format string, and where the 16 byte format is transferred in the 64 byte field, it shall be repeated four times. The path terminating equipment (PTE), depending on the standard in use, must therefore be able to continuously compare either a 16 byte long string, or a 64 byte long string with an expected code of the J1 string (trace).

Traces having a standardized length of 16 bytes are created in all major layers of connection known for the SDH standard, for checking stability of transmission in a particular layer. For example, byte J0 of the SOH is used for producing such a standard trace at the Section layer for detecting troubles in transmission between a terminal element and the associated repeater; byte Z5 optionally produces a 16 byte long tandem trace at a so-called Tandem Connection layer and byte J2 is used for forming a 16 byte trace for checking transmission between SDH containers at a so-called Tributary layer.

A CRC7 polynomial algorithm is presently utilized in SDH for detecting errors in the traces. It should be noted, that the CRC7 procedure requires the beginning (and the end) of the trace under examination to be strictly defined, i.e., its result depends on which particular byte and bit is considered the beginning of the cyclically repeating trace.

In SONET, only the above-described J1 byte of POH is presently defined as a byte creating a standardized 64 byte trace (though not equipped with the CRC7 procedure) for detecting troubles in the path transmission. However, the standardization process has a pronounced tendency to harmonization, and nowadays a number of developments to the SONET standard is being discussed by specialists. In all likelihood, the creating and checking of some additional traces will be proposed for SONET (and probably, for SDH) in the course of such developments.

U.S. Pat. No. 5,701,293 describes a trouble surveillance apparatus for a transmission system, comprising an input memory means for storing data representing lines and paths of the transmission system. Every time such data is input in the memory, a comparison element compares the previous state of the system stored in the memory with a state of the system currently input in the memory. If no change is found between them, the current state of the system is kept the same as the previous state thereof. It is therefore judged that no new trouble is caused. If any change is found, a trouble judging element seeks trouble corresponding to the change to store data as a link in a trouble memory. Unless any change is found, the previous input data is only compared with the currently input data. The algorithm is supposed to be effective also for high speed applications. On the one hand, it can appear to be too sensitive in cases where insignificant transition processes, temporarily affecting data, take place in the layer. On the other hand, the described method would require quite a large memory means at a terminating element, if long messages, such as 16 byte or 64 byte J1 strings, were to be compared directly. Moreover, a system designed to directly compare messages of any specific predetermined length is inapplicable "per se" for comparing messages having a different length.

Standards and Recommendations dealing with SDH and SONET transmission systems do not describe or suggest any universal method of checking data strings suitable both to SDH and SONET.

SUMMARY OF THE INVENTION

It is therefore an object of the present invention to provide a universal process for detecting troubles in data transmission in SONET or SDH telecommunications systems by checking traces produced at various layers of the system and having standard leng.

One of the particular objects of the invention is to provide an improved universal algorithm for generating a Trace Indication Mismatch signal in a path of SDH or SONET transmission system.

The main object of the invention can be achieved by providing a method of detecting troubles in transmission over a layer of connection in a transport telecommunication network based on SDH or SONET standard, comprising the following steps:

obtaining periodically transmitted strings of a standard length, each of said strings being formed using an overhead byte defined therefor in said layer;

checking said periodically transmitted strings by applying a BIP16 procedure thereto.

Generally, the standard length (i.e. the repetitive length of a string suitable for applying to it the BIP16 procedure) may comprise any pre-selected number of bytes, preferably more than two. Presently, two standard lengths—16 bytes long and 64 bytes long—are accepted for the mentioned strings in SONET/SDH and used in practice.

The BIP16 procedure comprises concatenated results of two BIP8 procedures, namely: BIP16 is BIP8 of the odd bytes concatenated with BIP8 of the even bytes of the string (the order is of no importance). In turn, the BIP8 procedure is a Bit Interleave Parity procedure, wherein each bit of a resulting BIP8 byte is a parity bit done across a specific bit position—e.g., bit 2 of the BIP8 byte is the parity of the $2^{nd}$ bit of all the bytes being checked.

Generally, the periodical strings can be checked for stability of transmission by comparing results of the BIP16 procedure applied to each of them.

In a particular version of the method, the step of checking further comprises a step of comparing the BIP16 of an expected trace having the same standard length, with said periodically transmitted strings; herein said expected trace is a preliminarily received message.

In practice, the method can be accomplished in the following way:

obtaining for each of said strings a binary word being the result of the BIP16 procedure performed on said string;

determining a signature by assigning to it the value of said binary word if the latter has repetitively been obtained for a pre-selected number N of said, consecutively received, strings;

comparing said signature with an expected binary word, wherein the expected binary word is the BIP16 of said expected trace.

The above-described method may terminate with a step of initiating an error signal if the signature does not coincide with said expected binary word.

However, the method may be fulfilled by continuous re-checking of the signature; the step of initiating an error signal will be issued only if the rechecked signature does not coincide with said expected binary word.

The signature rechecking step may comprise comparing said signature with the BIP16 binary words of M consecutive newly received strings, and updating said signature if the BIP16 binary words of all said M newly received strings differ from said signature.

The method of the invention may also comprise a step of rechecking the expected binary word.

Preferably, the step of rechecking the expected binary word is accomplished if the BIP16 binary words of all said M consecutive newly received strings are equal to the signature. If the signature does not coincide with the rechecked expected binary word, an error signal can be initiated.

In the most preferred version of the method, it is applied to a path connection layer of SONET or SDH, said string is a J1 string formed using an overhead byte J1 of a plurality of data frames consecutively received at a Path Terminal Equipment (PTE), each of said frames comprising said overhead byte J1 in a Path OverHead (POH) portion of the frame, and said error signal is used for generating a signal of Trace Indication Mismatch in a path. The specialists know that in this case, the expected trace is a message preliminarily received via a control channel.

As has been explained above, the 16 or the 64 byte standard J1 string can be formed by using the data channel of the repetitively transmitted contents of the J1 byte. The 64 byte trace (in SONET) can optionally comprise a portion formed by the repetitively transmitted byte J1 and a portion formed by other bytes.

It should be noted that the method is also applicable to standardized strings presently formed at other layers of SDH, for example to 16 byte long strings produced by bytes J0, J2 and Z5 at the Section layer, the Tributary layer and Tandem Connection layer, respectively.

While the inventive method is applicable both to 16 bytes long and to 64 bytes long strings, i.e. to both standard lengths presently standardized and used in SONET and SDH, it can effectively be used for checking strings having any standard length, and especially—for considerably long strings.

Referring to the J1 string example, it can be seen that, the BIP16 message is 16 bits long, which is ⅛ the length of the J1 string in SDH, and 1/32 the length of that in SONET. It should be emphasized that since the length of the BIP16 message is independent from the length of the string, it forms a universal and compact basis for checking the strings both in SDH and SONET. Moreover, the BIP16 procedure is independent from the order of bytes in the string, thus it does not require any indication of the beginning and/or the end of the trace since the length of the cyclically repeating trace is pre-selected. All that is required is to know the length of the actual string which is being checked for stability.

BRIEF DESCRIPTION OF THE INVENTION

The universal process for detecting troubles in data transmission will be further be explained using a non-limiting example of determining a trace indication mismatch over a path in SDH or SONET, and the following non-limiting drawing.

FIG. 1 is an exemplary flow-chart of the algorithm for detecting a trace indication mismatch in a path by checking stability of a trace produced by the POH byte J1.

DETAILED DESCRIPTION OF THE PREFERRED EMBODIMENT

FIG. 1 illustrates an exemplary schematic flow-chart of the proposed method utilized for determining a Trace Indication Mismatch in a path (TIM-P) and based on the examining of strings produced by the POH byte J1.

Let us assume that data frames, built in accordance with the SONET or the SDH standard, are duly transmitted every 125 μs by a terminal element (equipment) of a particular transmission path and respectively received by another terminal element (equipment) at the opposite side of the path. Each data frame reaching the receiving path terminal equipment comprises a payload and an overhead area, the latter including the Path Overhead portion (POH) with byte J1. For SDH, a 16 bytes long string formed from bytes J1 of 16 consecutively received frames constitutes a so-called J1 string. For SONET, such a J1 string is 64 bytes long.

According to the invention, the BIP16 procedure is applied to J1 strings received at the PTE, in order to detect troubles of transmission in the path. The result of such a BIP16 calculation is always 2 bytes long, regardless the length of the examined J1 string. In the following description, this result will be called J1BIP16_CALC.

FIG. 1 refers to a particular version of the method according to the invention, which can be performed by a SONET/SDH TOH (Transport Overhead) and POH (Path OverHead) termination device (TPOH chip) located at a user's path terminal equipment (PTE).

The flow-chart diagram of the method preferably includes two states schematically defined by two dotted contours. The first state is a search state, and the second state is a monitoring state, both of them being states of a Final State Machine describing the two-stage process.

Block 20 called "J1 search update" designates the start of the search state, where the TPOH device calculates BIP16 of each received J1 string (i.e., calculates a binary word called J1BIP16_CALC) and searches for N consecutive identical J1BIP16_CALC. In this particular example, the number "N" can be selected from any 4 bit value; by default, it is equal . The error flag J1_ERR is set to 1 at the beginning of the search state, as an initial condition, and J1_MON_ST is set to "0" to indicate that the process is in the search state.

The search continues until N identical binary words J1BIP16_CALC are consecutively found. In other words, block 22 seeks for N equal consecutive J1 string messages by comparing their BIP16. When this occurs (Block 22), such a binary word J1BIP16_CALC is considered stable, and is registered and designated as a so-called signature J1BIP16_SIGN (Block 23).

Block 24 performs comparison of the recorded signature J1BIP16_SIGN with an expected binary word (J1BIP16_SW) supplied by the controlling software. The expected binary word (J1BIP16_SW) is provisioned by the system controller in the following way. When starting the connection, the controller receives, via a control channel, a message being the expected J1 trace (string) to be transmitted. The microprocessor calculates the BIP16 of this trace, and the result of the calculation is supplied to the TPOH as the expected binary BIP16 word (J1BIP16_SW). If the results of Block 24 are true, i.e. the J1BIP16_SIGN being the stable BIP16 of the received strings) is equal to J1BIP16_SW being the BIP16 of the expected trace, , the initially set error flag is removed in Block 25: (J1 ERR=0). If J1BIP16_SIGN does not equal J1BIP16_SW, the error flag is reconfirmed in Block 25a (J1_ERR=1), indicating that a stable string has been received, but that it is not the expected trace.

It should be noted that theoretically the algorithm may comprise one stage, i.e., after receiving the comparison result from block 24, the process might be workable without entering the second (monitoring) state. Indeed, if the compared values are equal (block 25), a new round of search could be established at block 20 to continue the check of newly received strings, and if J1BIP16_SIGN does not coincide with J1BIP16_SW, an error (J1_ERR=1) manifested in block 26 could be used for determining the Trace Indication Mismatch.

However, in the algorithm shown in FIG. 1, the second monitoring) state will start upon the comparison in block 24. It means that in either case, since a stable string has been received the program proceeds to the path monitoring.

The monitoring state begins by setting a so-called J1 Monitor state of TPOH (Block 27) into an active state (J1_MON_ST=1). The error flag is unaffected, and remains in its previous state. In the monitoring state, J1BIP16_CALC is obtained over each newly incoming J1 string and each J1BIP16_CALC is compared to the previously recorded J1BIP16_SIGN. The monitoring step is exited if M values of J1BIP16_CALC are received that differ from J1BIP16_SIGN (see block 28 "M×J1 unstable messages", wherein the number "M" can be selected in a way similar to that of selecting "N", and in this particular example "M" is equal to 8). It means, that the recorded stable signature is not "stable enough" and has to be updated; the algorithm thus returns to the search state, Block 20. (As previously mentioned, in Block 20, J1_ERR is automatically set to 1, and J1_MON_ST is set to 0 to indicate that the search state is active.)

However, if M calculated J1BIP16_CALC do not differ from the previously recorded J1BIP16_SIGN, the signature J1BIP16_SIGN is compared again with expected data J1BIP16_SW' (Block 30). This comparison is now done, because J1BIP16_SW may have been updated in the interim. As previously stated, in the event of a mismatch between the expected BIP16 and the stable received BIP16 (block 25), the error flag remains active. The controlling software may recheck the expected BIP16, and change the value. Alternatively, a revised or resent expected trace may be sent over the control channel, which will result in a different value for J1BIP16_SW. The updated value is indicated J1BIP16_SW'.

If they are found to be equal, the internal alarm is canceled (J1_ERR=0, Block 31), and the program again proceeds to the monitoring state (Block 27). If a discrepancy between the compared values is found, this will confirm the error signal (J1_ERR=1, Block 32), and the program will again proceed to the monitoring state, i.e. the error will be continuously re-checked by Block 27.

The internal flag J1_ERR of the J1 Monitor is used by the controlling software as a major determinant for issuing a signal of Trace Mismatch Indication in the path (TIM-P) The controlling software will use a number of other factors, such as an absence of certain other alarm conditions, (which are not disclosed in the frame of the present application), for initiating an Alarm Indicating Signal AIS and a Remote Defect Indication signal RDI within 250 μs after the TIM-P has been stated.

What is claimed is:

1. A method for checking data strings over a layer of connection in a telecommunication network, the method being suitable for both SDH standard and SONET standard, the method comprising:

preliminarily obtaining an expected trace having a standard length;

applying a BIP16 procedure to said expected trace to obtain an expected binary word;

obtaining periodically transmitted strings having said standard length by arbitrarily selecting the beginning of each of said strings from a data trace formed using an overhead byte defined therefor in said layer;

checking said strings by applying a BIP16 procedure to each of them to obtain a resulting binary word; and comparing said periodically transmitted strings with said expected trace using results of said BIP16 procedure respectively applied thereto.

2. The method according to claim 1, wherein the standard length of said strings is 16 bytes.

3. The method according to claim 1, wherein the standard length of said string is 64 bytes.

4. The method according to claim 1, wherein said layer is a path connection layer, and said string is a J1 string formed using an overhead byte J1 of a plurality of data frames consecutively received at a Path Terminal Equipment (PTE), each of said frames comprising said overhead byte J1 in a Path OverHead (POH) portion of the frame.

5. The method according to claim 4, further comprising a step of initiating an error signal used for generating a signal of Trace Indication Mismatch in a path.

6. The method according to claim 1, wherein said checking comprises steps of:

determining a signature by assigning to it the value of said binary word if the latter has repetitively been obtained for a pre-selected number N of said consecutively received strings; and wherein said step of comparing comprises comparison of said signature with the expected binary word being the result of said BIP16 procedure performed on said expected trace.

7. The method according to claim 6, further comprising re-checking of said signature.

8. The method according to claim 6, further comprising a step of rechecking the expected binary word.

9. The method according to claim 6, further comprising a step of initiating an error signal if the signature does not coincide with said expected binary word.

10. The method according to claim 9, further comprising a step of rechecking the expected binary word.

11. The method according to claim 9, further comprising re-checking of said signature.

12. The method according to claim 11, further comprising a step of rechecking the expected binary word.

13. The method according to claim 11, wherein said rechecking of the signature comprises comparing thereof with M BIP16 binary words of respective M newly received consecutive strings.

14. The method according to claim 6, further comprising re-checking of said signature.

15. The method according to claim 14, further comprising a step of rechecking the expected binary word.

16. The method according to claim 14, wherein said rechecking of the signature comprises comparing thereof with M BIP16 binary words of respective M newly received consecutive strings.

17. The method according to claim 16, further comprising a step of rechecking the expected binary word if all said M BIP16 binary words are equal to said signature, and a step of initiating an error signal if said signature does not coincide with the rechecked expected binary word.

18. The method according to claim 16, further comprising a step of rechecking the expected binary word.

19. The method according to claim 16, further comprising re-determining said signature if it does not match to any of said M BIP16 binary words.

20. The method according to claim 19, further comprising a step of rechecking the expected binary word.

* * * * *